(12) United States Patent
Fislage et al.

(10) Patent No.: US 9,940,494 B2
(45) Date of Patent: Apr. 10, 2018

(54) RFID READING APPARATUS FOR SHELF OCCUPANCY DETECTION

(71) Applicant: SICK AG, Waldkirch (DE)

(72) Inventors: Michael Fislage, Waldkirch (DE); Florian Pudenz, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 15/595,456

(22) Filed: May 15, 2017

(65) Prior Publication Data

US 2017/0344772 A1 Nov. 30, 2017

(30) Foreign Application Priority Data

May 31, 2016 (EP) .................................... 16172291

(51) Int. Cl.
*H01Q 1/22* (2006.01)
*G06K 7/10* (2006.01)
*H01Q 1/38* (2006.01)

(52) U.S. Cl.
CPC ........... *G06K 7/10415* (2013.01); *H01Q 1/38* (2013.01); *G06K 7/10336* (2013.01); *H01Q 1/2216* (2013.01)

(58) Field of Classification Search
CPC ........... G06K 7/10316; G06K 7/10297; H01Q 1/2216; H01Q 1/2208
USPC .................................. 340/10.1, 12.51, 12.26
See application file for complete search history.

(56) References Cited

U.S. PATENT DOCUMENTS

| 7,079,081 B2 | 7/2006 | Parsche et al. |
| 2010/0328039 A1* | 12/2010 | Noda ............... G01S 5/0027 340/10.1 |
| 2014/0375501 A1 | 12/2014 | Nikitin |

FOREIGN PATENT DOCUMENTS

| DE | 102013016116 A1 | 3/2015 |
| EP | 1181742 B1 | 12/2007 |
| EP | 2903086 A1 | 8/2015 |
| WO | 2010/042846 A2 | 4/2010 |

OTHER PUBLICATIONS

European Search Report dated Dec. 9, 2016 issued in corresponding the European Patent Application No. 16172291.3.

* cited by examiner

*Primary Examiner* — Kevin Kim
(74) *Attorney, Agent, or Firm* — Nath, Goldberg & Meyer; Jerald L. Meyer; Joshua B. Goldberg (57) ABSTRACT

An RFID reading apparatus (20) for shelf occupancy detection comprises an elongated antenna (18) with an outer conductor (26) and an inner conductor (28) arranged in the outer conductor (26), an RF transceiver (22) connected with the antenna (18), and a control and evaluation unit (24) configured to communicate with an RFID transponder (14) via the RF transceiver (22) and the antenna (18) by means of RFID signals. The outer conductor (26) comprises a plurality of slot structures (16) over its longitudinal extent each for transmitting and receiving RFID signals.

17 Claims, 5 Drawing Sheets

RFID READING APPARATUS FOR SHELF OCCUPANCY DETECTION

The invention relates to an RFID reading apparatus for shelf occupancy detection as well as a method for manufacturing an antenna according to the preamble of claim 1 and 14, respectively.

RFID reading systems are used for automatic identification of objects. RFID transponders attached to the objects are read and, where appropriate, information is written back into the transponder. The collected information is used to detect the location, the destination or other properties of the object and to thus control storage and flow of goods and products. There are different types of RFID transponders which differ for example in the frequencies used or in whether they operate actively with their own power supply or passively with the transmission energy of the reading system. One example is the established ultra-high frequency standard (UHF) ISO 18000-6 for passive transponders which are read according to the backscatter method.

The objects bearing the transponders are often stacked, in particular for storage, in an ordered fashion and are arranged in several layers or rows. A typical example is a rack having shelves or rows of containers. In this case the RFID reading system should meet the requirement to detect the current shelf occupancy, i.e. which shelves are occupied or whether there is a container at a specific shelf position, and what the content of the respective shelf or container is. By writing back to the transponder, information of the transponders can be kept consistent even after refilling or removal of objects. Transponders may be located both at the respective shelves or containers and on the individual objects stored therein.

An application for the automatic detection of shelf occupancy is production process control, where the storage can be significantly reduced by knowledge of the local stocks and the current demand of raw materials and intermediate products measured by the objects taken (Kanban principle). For example, containers are to be detected in a Kanban rack when being loaded at the rack's backside and when being removed at the rack's front. For this purpose, RFID transponders need to be read over the entire width of the rack, even in case of containers or shelves having different widths. In addition, there are small distances between shelves and metallic racks or containers.

Prior art RFID systems for shelf occupancy detection use remote antennas per shelf row, container row, or even container. The actual RFID reading apparatus is for example attached to the shelf at the side. This causes considerable costs for installation of the antennas and especially their wiring. These are not even one-time costs, but will repeat for maintenance or changes of the shelf, for example when using different containers.

EP 2 903 086 A1 discloses an RFID reading apparatus for shelf occupancy detection. A plurality of antenna circuit boards is inserted in an elongated hollow profile. The technical complexity is comparatively high, because virtually every reading point has a tunable antenna. Thus, there are very low installation and maintenance costs, but with high manufacturing costs for numerous individual antennas.

EP 1 181 742 B1 describes an antenna for a vehicle or a mobile phone, where a slot is provided in a folded sheet metal. An antenna with a similar basic structure is also known from U.S. Pat. No. 7,079,081 B2. However, this is neither intended nor suitable for an elongated antenna as is required in the shelf occupancy detection. WO 2010/042846 A2 discloses an antenna from sheet metal folded as a spiral. Again, the length of this antenna is not a free parameter, but depends on the desired working frequency.

From communication applications in the transport sector, such as tunnels, railways, elevators or the like, so-called 'leaky-wave' cables are known. This structure consists of a coaxial cable whose outer conductor, at certain points, has interruptions which cause small emissions of the signal. These cables are designed for very long distances of several hundred meters, and therefore the emitted signal components are very small in order not to cause too much attenuation. One can estimate the coupling factor to be about 60 dB, i.e. individual interruptions in the outer conductor of the cable generate slot emitters have an antenna gain of about −30 dBi. It is therefore assumed that the receiver has its own means of subsequent signal processing and amplification, such as in a mobile phone. If such cables were to be used as the antenna of an RFID reading apparatus for reading an RFID transponder, the signals of the reading apparatus would already reach the transponder with at least a 60 dB loss. However, the transponder response suffers the same attenuation on the return path. The signal levels are too low so that communication is impossible.

It is therefore an object of the invention to provide an RFID reading apparatus which is more suitable for shelf occupancy detection.

This object is satisfied by an RFID reading apparatus for shelf occupancy detection, the RFID reading apparatus comprising an elongated antenna with an outer conductor and an inner conductor arranged in the outer conductor, an RF transceiver connected with the antenna, and a control and evaluation unit configured to communicate with an RFID transponder via the RF transceiver and the antenna by means of RFID signals, wherein the outer conductor comprises a plurality of slot structures over its longitudinal extent each for transmitting and receiving RFID signals.

Thus, an elongated antenna comprises an outer conductor and an inner conductor, wherein the inner conductor is arranged in the outer conductor in a coaxial arrangement. A control and evaluation unit communicates via an RF transceiver connected to the antenna with transponders in the vicinity. The invention starts from the basic idea to provide a plurality of slot structures over the longitudinal extent of the outer conductor. There, RFID signals are emitted and received, so that the slot structures act like a plurality of interconnected individual antennas. The principle is similar to the 'leaky wave' cable mentioned in the introduction, but the slot structures emit and receive significantly stronger signal components, thus making it possible to use them in an RFID reading apparatus.

The object is also satisfied by a method for manufacturing an antenna, wherein a plurality of slot structures each for transmitting and receiving RFID signals is provided on an elongated hollow profile element over its longitudinal extent at a desired spacing, the elongated hollow profile element is cut to a desired length, and an inner conductor is arranged in the elongated hollow profile element.

The invention has the advantage that a rod-like antenna is made with few and simple components, where over the outer contour of the antenna signals are emitted and received. A largely homogenous electromagnetic field can be generated over the longitudinal extent. The antenna is freely scalable, meaning that it can be manufactured in any dimensions and can even be cut to any length. This creates a scalable, fast, robust and cost-effective solution for shelf occupancy detection.

The outer conductor preferably is an elongated hollow profile element having a same cross section over its longitudinal extent. This simplifies manufacturing, handling, and provides homogenous antenna characteristics. In particular, the elongated hollow profile preferably is an extruded profile, since this technique is suitable to easily produce a hollow profile with a desired cross-section in various lengths. Throughout this specification, preferably or preferred relates to an advantageous, but completely optional feature.

The antenna preferably comprises a tunable matching element. This is useful for adapting the characteristics of the antenna to its specific design, but also to the respective installation situation. The matching element can for example be accommodated in an end cap at an end of the antenna opposite the connection for the RF transceiver. The matching element can also function as an absorber for electromagnetic signals, so that an RF signal from the RF transceiver longitudinally traveling through the antenna is not reflected back to the RF transceiver. To this end, the matching element preferably comprises a resistor.

The antenna preferably comprises a plurality of antenna modules connected in series. Preferably, coaxial connectors are provided at the ends of the antenna modules. Since the invention enables cutting the antenna to a required length, a plurality of antenna modules is not often required. Nevertheless, there is in principle not only the possibility to cut a long antenna to required dimensions, but also conversely an extension by the use of several antenna modules.

The slot structures preferably are of the same type. This facilitates manufacturing, subsequent length adaption, and simplifies obtaining the same antenna characteristics in all positions.

The slot structures preferably are distributed over the entire longitudinal extent. This enables reading along the entire antenna. Preferably, the slot structures are provided at equal intervals. This facilitates manufacturing and length adaption as well as the same antenna characteristics over the length of the antenna. The distance raster can be selected according to a container or shelf width.

The slot structures preferably comprise at least one enlarged opening at an end region. The available surface area on the outer conductor for the slot structures is limited, in particular since the antennas are to have a small cross section in order to be as compact as possible. Enlarged openings at the end regions of the slot structures reduce the required area since the slot can be correspondingly shorter.

The slot structures preferably form a folded two-dimensional pattern. This is another possibility to consume less area at a same effective length of the slot.

The slot structures preferably extend beyond a longitudinal edge of the outer conductor. These slot structures are not arranged on only one outer surface, but extend over at least one additional outer surface. This provides more area for the slot structures. Of course, a longitudinal edge only exists in case of a cross section having corners.

The outer conductor, in cross section, preferably comprises a folded outer contour with at least one notch and/or at least one projection. The outer conductor therefore is not simply round or rectangular in cross-section, but is folded in order to provide the notches and projections. This increases the surface area and thus enables longer slot structures. Additional mechanical advantages are possible, for example by increasing the bending strength, or in that the edges formed by the notches and projections over the length of the antenna are used for mounting on a rack.

A tunable element preferably is assigned to each slot structure, wherein the tunable element is connected with the control and evaluation unit via a signal line. The tunable element may for example be a capacitance diode or a HF transistor (HF=High Frequency, in particular RF=Radio Frequency). By varying properties of the tunable element, the effective coupling of the respective slot structure may significantly be reduced and virtually turned off. Communication with RFID transponders can thus be restricted to certain regions of the antenna, in particularly to only the vicinity of one single slot structure. The signal line can act on the tunable element directly or via a control element.

The antenna preferably comprises at least one display element associated with the antenna modules. This provides the user with a visual, position-specific feedback. The display element may be a screen, but preferably is a very simple form of display. For example, LEDs are arranged on the outer conductor at the slot structures. It is also possible to arrange light source in the interior of the outer conductor, with their light exiting through the slot structures. Via blinking sequences or colors, various bits of information can be displayed with one LED.

The antenna preferably is arranged parallel to shelf elements or is used as a shelf element. Depending on the embodiment, the antenna itself is part of the shelf, is used to stabilize the shelf, or at least is incorporated into the shelf so that it does not interfere with operation, in contrast to a conventional wiring. The antenna can be mounted horizontally or vertically, in order to specifically detect shelf sections or containers in a corresponding arrangement.

The method in accordance with the invention can be further developed in a similar manner with additional features and shows similar advantages. Such advantageous features are described in an exemplary, but not exclusive manner in the dependent claims following the independent claims.

In the method according to the invention for manufacturing an antenna, which in particular is used in an RFID reading apparatus according to the invention, a plurality of slot structures for emitting and receiving RFID signals is provided in a hollow profile element over its longitudinal extent at a desired distance from one another. The hollow profile element is reduced to a required length, and an inner conductor is arranged in the hollow profile. The hollow profile element can be simply cut or sawn to the required length. This is optionally done before or after the slot structures have been provided, and also optionally before or after the inner conductor is disposed therein.

It is thus possible to store long antenna blanks in the form of hollow profiles with or without inner conductors as well as with slot structures in a plurality of different spacing grids, to then take an antenna blank with a desired spacing of the slot structures as required, and to cut off the required length. However, it is also possible to extend the antenna by connecting antenna modules in series, wherein at least one of these modules may also be cut to a desired length. Therefore, it is sufficient to have antenna modules with a standard length of for example 1 m in order to form any length by combining antenna modules and for example trimming the first or last antenna module.

The elongated hollow profile element and thus the antenna preferably is completed at one end with a coaxial connector and at the other end with an end piece comprising a matching element. In case of antenna modules to be connected in series, there is preferably a coaxial connector instead of the end piece for connecting the subsequent antenna module, with the end piece including the matching element being provided in the terminal antenna module.

The matching element preferably absorbs RFID signals. Thus, RFID signals travelling through the coaxial antenna conductor and arriving at the end opposite the RF transceiver are absorbed rather than reflected. The matching element preferably comprises a resistor, which is a simple but sufficient component for absorbing the RFID signal.

The invention will be explained in the following also with respect to further advantages and features with reference to exemplary embodiments and the enclosed drawing. The Figures of the drawing show in.

Figure 1:
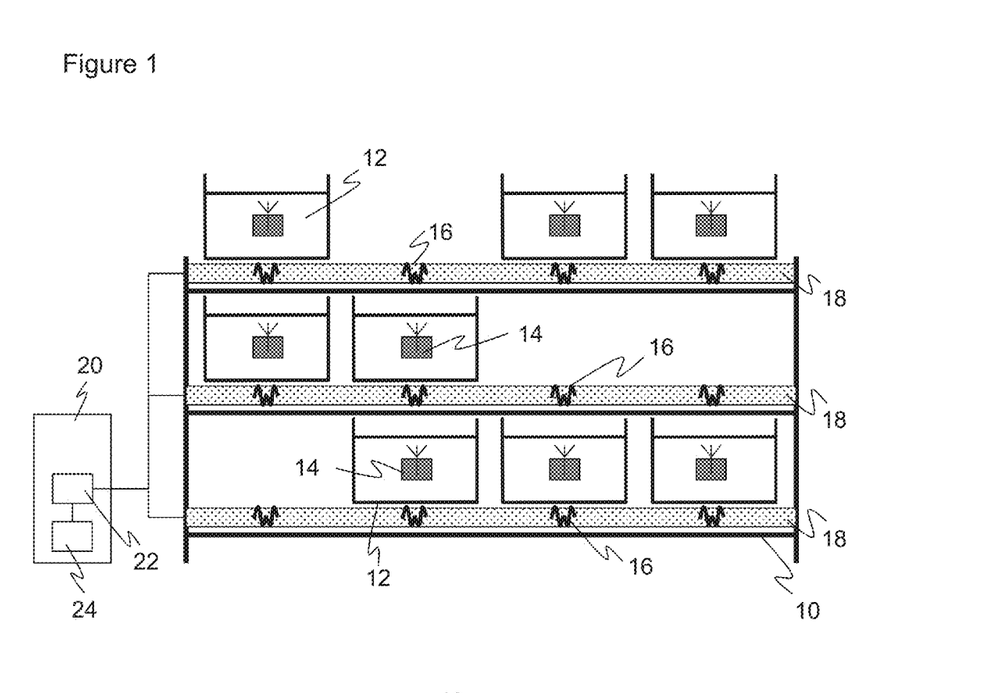
FIG. 1 an overview of a shelf with antennas and an RFD reading apparatus for shelf occupancy detection.

FIG. 1 shows an overview of a rack or shelf 10 having a plurality of shelves or compartments for containers 12, in particular Kanban containers. In the containers 12, objects are stored, which are not shown. In other embodiments, the shelves or compartments may be separated, or objects may be stored without containers 12. The containers 12 and/or the objects stored therein are equipped with transponders 14.

At the shelf 10, several elongated antennas having a plurality of individual antennas 16 are arranged. The antennas each comprise a plurality of slot structures where electromagnetic signals are emitted and received. The exact construction of the antennas will be explained in more detail below.

The antennas are part of an RFID reading apparatus 20 which in FIG. 1 is shown as a separate block. As an alternative, it is also possible to at least partially, if not completely, integrate the RFID reading apparatus into the shelf 10. The RFID reading apparatus 20 comprises an RF transceiver 22, which is connected to the antennas 18, and a control and evaluation unit 24.

The RFID reading apparatus 20 reads the transponders 14 in a known manner. To this end, the functions of a conventional RFID method for example according to ISO 18000-6 are implemented in the control and evaluation unit 24, and the RFID signals required for communication with the transponders 14 are exchanged via the RF transceiver 22 and the antennas 18. As a result, objects and containers 12 are detected and assigned to specific storage locations, i.e. positions on the shelf 10. The RFID reading apparatus 20, or a higher-level system (Warehouse Management, ERP) to which the RFID readings apparatus 20 is connected, thus knows the current respective content of the shelf 10 in terms of containers 12 and objects. By the way, the usual term RFID reading apparatus 20 does not exclude that information is also written into the transponders 14, but reading usually is the more important task.

Display or control elements associated with the containers 12 or corresponding shelf sections may be provided, but are not shown in FIG. 1, such as liquid crystal displays, touch pads, or simple LEDs. This is done to provide the user a localized optical feedback, or to enter information about the container 12 or notify a higher-level management system. Some application examples are error messages, displaying an occupancy status, presence information of a container 12, entering a refill or pickup, displaying objects to be refilled or picked up ("Pick-to-Light", "Put-to-Light"), displaying state information of the antenna, or displaying the information read from the transponder 14. For displaying most of this information, simple blinking or color codes of cheap LEDs are sufficient.

The actual identification of containers 12 and objects stored therein is done by RFID readings. Nevertheless, it may be useful to merely detect the presence of containers 12 or objects independent of RFID readings. This can for example be used to locate the read RFID information, i.e. to assign it with specific objects, or to trigger an RFID reading. One or more additional sensors may be provided for this purpose, which are not shown, such as light barriers detecting whether or not there is a container 12 at the respective position. Placing a container 12 then may be used as a trigger for an REID reading, so that the possible container positions can be checked specifically and not blindly for example in a time-division multiplexing. Removing and adding objects can be detected similarly. The respective additional sensor may be integrated into the antenna 18. As an alternative, separate sensors are mounted at possible container positions. It is also conceivable that the antenna 18 itself functions as a presence sensor.

Figure 2:
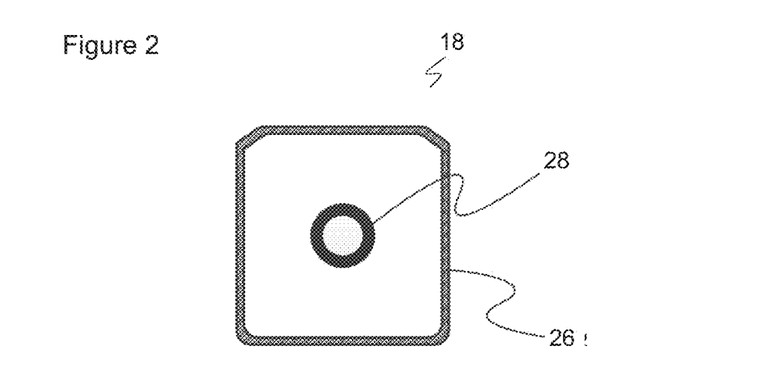
FIG. 2 a cross-sectional view of an antenna.

FIG. 2 shows a cross-sectional view of an antenna 18 in an embodiment with a very simple outer contour. The antenna 18 has a coaxial basic structure with an outer conductor 26 and an inner conductor 26 provided therein. The inner conductor 28 can be held in position by spacer elements, which are not shown.

The outer conductor 26 preferably is a hollow profile with a same cross section over its entire length, and is for example produced by extrusion. An extruded profile allows a very cost-efficient but mechanically robust housing. The outer conductor may thus be produced with a required length, or a suitable part is sawn from a blank which could be several meters long. It is also conceivable to arrange several hollow profiles in series and to connect them to form the outer conductor 26. The inner conductor 28 can be made as a tube or as a solid core.

Figure 3:
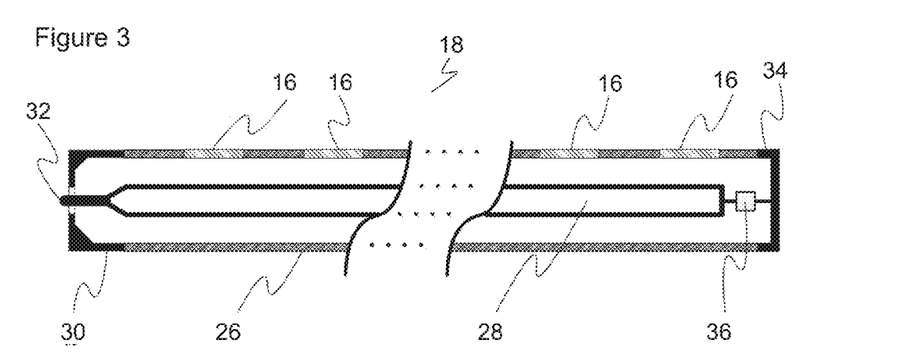
FIG. 3 a longitudinal sectional view of an antenna.

FIG. 3 shows a longitudinal section of the antenna 18. The outer conductor comprises slot structures 16, which will be explained in detail, on at least one outer surface. At a first end portion 30 of the antenna 18, there is a connection 32 to the RF transceiver 22 for example with a standardized HF coax connector. At an opposite second end region 34, a matching element 36 can be provided. The matching element 36 may be removable. One possible function is on-site matching to adapt to a non-ideal mounting situation for example in a shelf 10 having metallic compartments or walls, or with metallic containers 12. An additional or alternative function is absorption of electromagnetic waves or signals, in particular RF signals of the RF transceiver 22 traveling over the length of the antenna 18. These RF signals are preferably absorbed rather than being reflected and interfering with other signals. The matching element 36 may comprise a resistor, which is a simple, but efficient component for absorbing electromagnetic signals. It is conceivable to provide another HF coax connector at the second end region 34 in order to connect several antennas 18 in series and to thus extent the effective length of the antenna.

Figure 4:
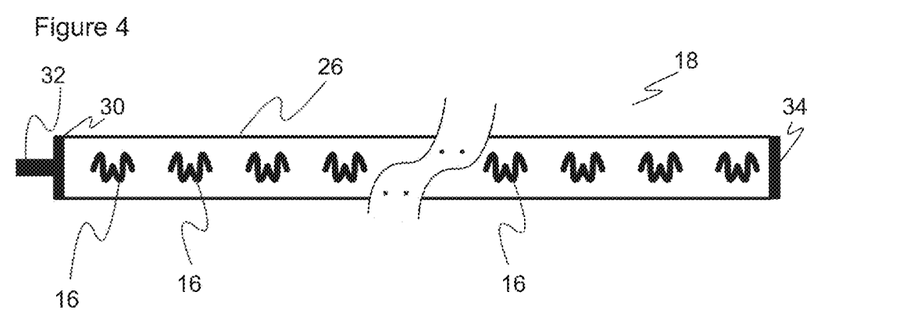
FIG. 4 a plan view of an antenna and its slot structure.

FIG. 4 shows a plan view of the antenna 18 and its outer conductor 26. Slot structures 16 are provided in the outer conductor 26 at certain distances, for example by milling, so that emission and reception of a high-frequency signal is possible at these positions.

The slot structures 16, with appropriate design, permit a directivity of the emitted signal. Alternatively, a uniform radiation around the antenna 18 is also possible, for example where transponders 18 are to be read in all directions by antenna 18. The shape of the slot structures 16 is not only matched to the desired type of emission, such as directional or non-directional, but also to the frequency range to be used. Only a small portion of the high-frequency signal provided by the RF transceiver is emitted at any single slot structure 16. This ensures that there is a homogenous emission over the length of the antenna 18.

The slot structures 16 form a uniform grid in the illustrated example. It is possible to provide blanks for outer conductors 26 with slot structures 16 in different grids or spacing corresponding to possible dimensions of the containers 12. With such classes, the variety of variants remains very small and manageable. The length of the outer conductor 26 can be adapted to the shelf 10 by cutting or trimming, and the inner conductor 28 may be adapted similarly. The end pieces or end regions 30, 34 are subsequently placed. Therefore, a simple length adaption of the antenna 18 according to requirements of the application is possible.

Figure 5:
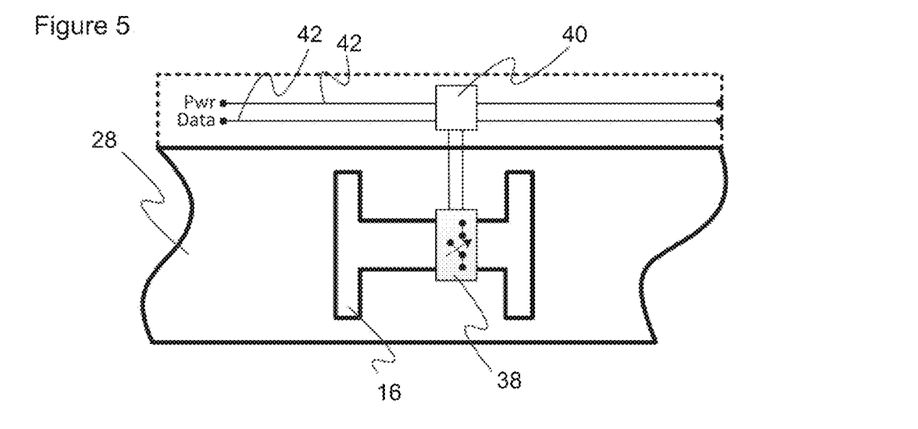
FIG. 5 an enlarged partial view of a slot structure of an antenna having a tunable element and control lines.

FIG. 5 shows a detailed view of only one slot structure 16. In a simple embodiment, all slot structures 16 of the antenna 18 emit a signal at the same time. However, in the embodiment of FIG. 5, there is kind of a switch for activating and deactivating individual slot structures 16. A tunable element 38 is provided at the slot structure 16, in particular at any slot structure 16 which is to be individually controllable, or at every slot structure. The tunable element 38 may comprise a capacitive diode or a HF transistor. A control element 40 is connected to the tunable element 38, which may be used by the control and evaluation unit 24 by means of lines 42 to short-circuit the respective slot structure 16. Alternatively, the tunable element 38 is directly controlled, without control element 40 being involved. Tunable element 38 may also be controlled with wireless signals, in particular RF signals, instead of via lines 42.

At slot structures 16 deactivated in this way, only a fraction of the energy is still emitted. When deactivating all slot structures 16 with the exception of one slot structure 16, positions of increased field strength can be generated along the antenna 18, and thus there are specific regions where communication with a transponder 14 may take place.

The lines 42 can also be used to control a visual display for example in the form of LEDs with only little additional costs. This may be used to display which slot structure 16 is currently active, or whether a transponder 14 has been read at a specific slot structure 16.

Figure 6A:
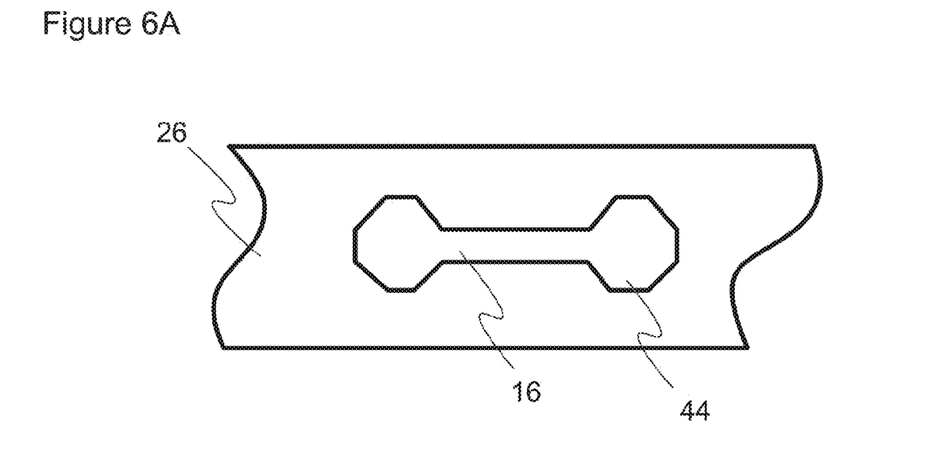
FIGS. 6A-C various exemplary geometries of a slot structure having enlarged end regions.
Figure 6B:
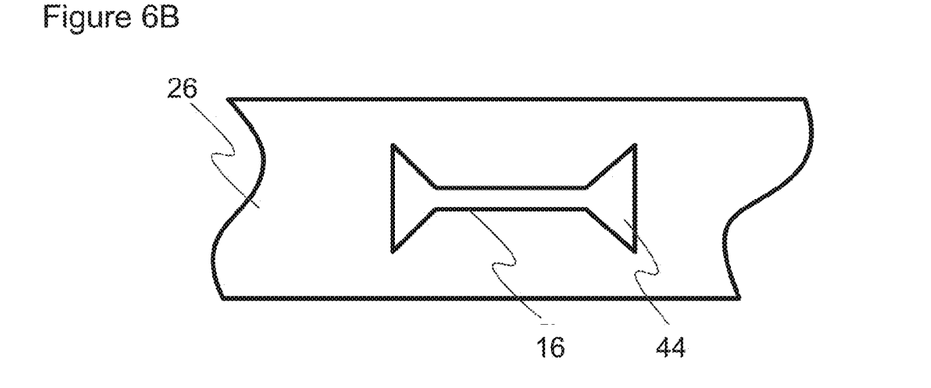
Figure 6C:
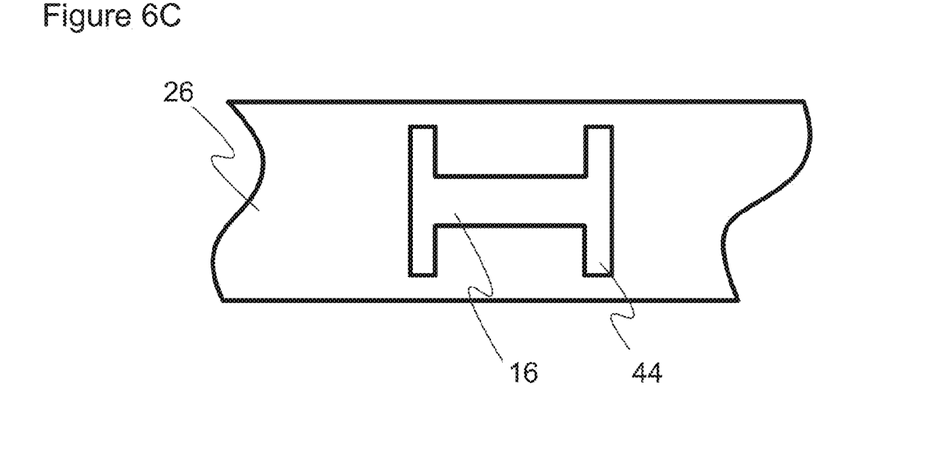

FIGS. 6A-C show various preferred geometries for the slot structures 16. In these embodiments, respective enlarged openings 44 are provided at the ends of the slot structure 16, Generally, the appropriate shape of the slot structure 16 depends on the amount of power which is to be emitted at the desired frequency. The outer contour of the antenna 18 should be small for simple handling and mounting, which strongly limits the surface area available for the slot structures 16. The required slot length can be reduced by the enlargements or openings 44. FIG. 6A shows an example with openings 44 shaped as a circle, FIG. 6B openings 44 shaped as a triangle, and FIG. 6C openings 44 shaped as a rectangle. Other shapes, like hexagons or squares, are also possible.

Figure 7:
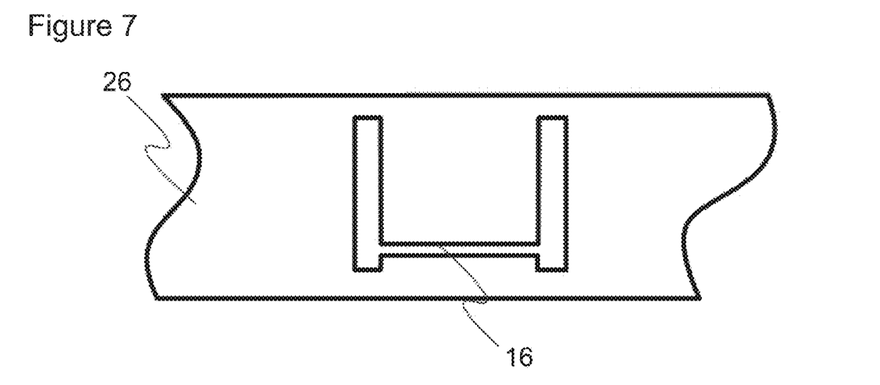
FIG. 7 an exemplary geometry of a folded slot structure.

FIG. 7 shows a further example of a slot structure 16 to illustrate that a longer slot structure on a small surface area is also possible by folding. In other words, the slot structure 16 forms a two-dimensional pattern. The H-shaped patter of FIG. 7 is still comparably simple, more complicated patterns are possible.

Figure 8A:
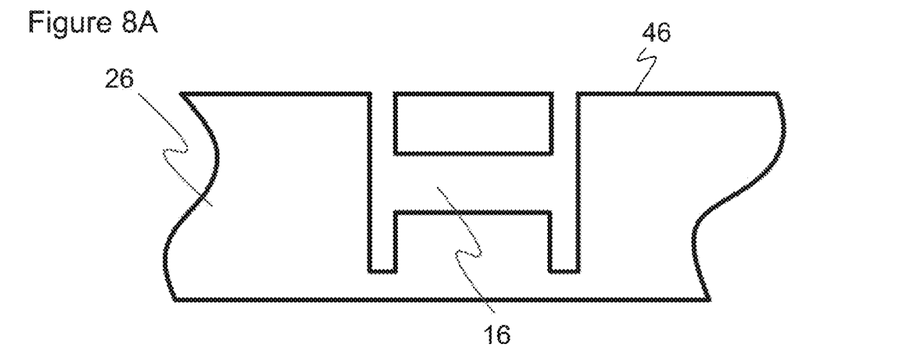
FIGS. 8A-B an exemplary geometry of a slot structure extending beyond a longitudinal edge.
Figure 8B:
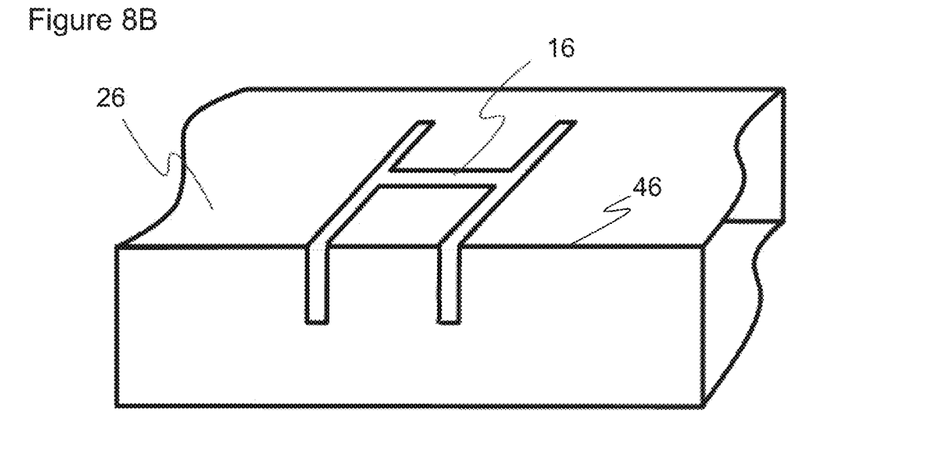

FIGS. 8A-B show a further possibility of advantageously using the existing surface area for slot structures 16. In this case, the slot structure is extended beyond a longitudinal edge 46 of the outer conductor 26. Then, several surfaces of the outer conductor 26 are available to the slot structure 16. It is also conceivable to provide the slot structure 16 over several longitudinal edges 46, even multiple times in a spiral around the outer conductor 26. However, the increase in slot length needs to be balanced against stability and the more complicated manufacturing.

Figure 9:
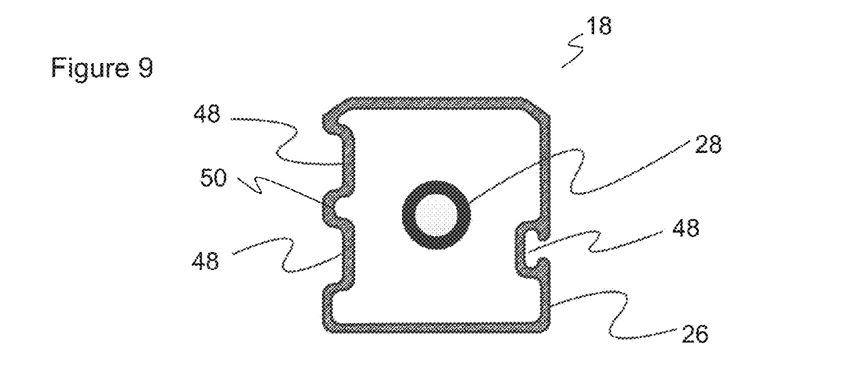
FIG. 9 a cross-sectional view of an antenna having a profiled outer contour.

An advantage of a hollow profile, in particular in the case of production by extrusion, is the freedom to define the cross-section. While FIG. 2 shows an antenna 18 with a simple, almost rectangular cross-section, FIG. 9 illustrates a first example for deviating from simple external contours. For this purpose, various notches 48 and projections 50 are provided. This increases the surface area available for slot structures 16 at the outside. The modified outer contour can also be used mechanically, for example for mounting the antenna 18 at the shelf 10, in particular to facilitate a retrofitting of the RFID readings apparatus 20 with its antennas 18. From blanks of hollow profiles with different outer contours, antennas 18 suitable for a respective shelf 10 can easily be manufactured. An adaption to a modified cross-sectional geometry is also simply possible via the radius of the inner conductor 28.

Figure 10A:
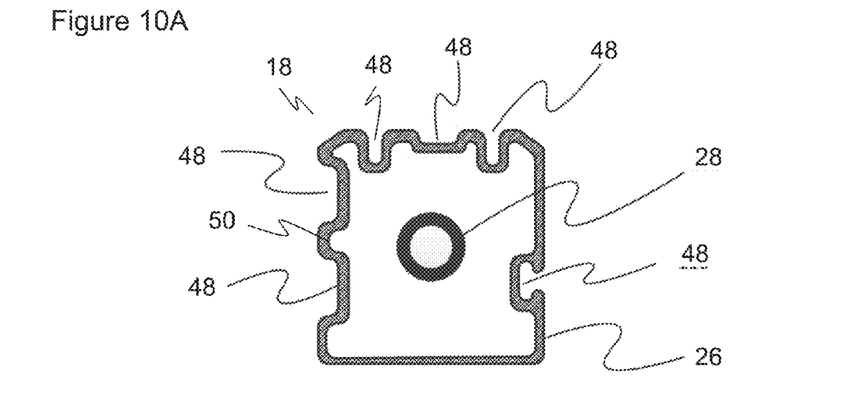
FIG. 10A a cross-sectional view of an antenna with another profiled outer contour.
Figure 10B:
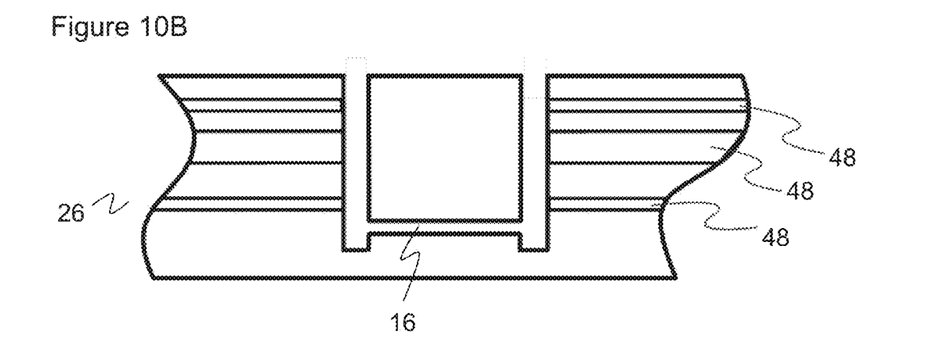
FIG. 10B a plan view of an outer contour according to FIG. 10A with a slot structure provided thereon.

FIGS. 10A-B illustrate another example of a modified cross-section of the outer conductor 26 and a preferred slot structure 16. The additional grooves and edges resulting from the notches 48 and projections 50 increase the surface area and thus the effective slot length. Therefore, a resonant slot structure 16 can also be provided on a smaller outer conductor 26 and thus a smaller antenna 18.

The various embodiments for arranging a slot structure 16 on a small surface area, such as enlarged openings 44, folding the slot structure 16 to form a two-dimensional pattern, extending the slot structure 16 beyond a longitudinal edge 46 and a modified outer contour, may also be combined in any desired manner.

The invention claimed is:

1. An RFID reading apparatus (20) for shelf occupancy detection, the RFID reading apparatus (20) comprising
an elongated antenna (18) with an outer conductor (26) and an inner conductor (28) arranged in the outer conductor (26),
an RF transceiver (22) connected with the antenna (18),
and a control and evaluation unit (24) configured to communicate with an RFID transponder (14) via the RF transceiver (22) and the antenna (18) by means of RFID signals,
wherein the outer conductor (26) comprises a plurality of slot structures (16) over its longitudinal extent each for transmitting and receiving RFID signals and
wherein the antenna (18) comprises a tunable matching element (36).

2. The RFID reading apparatus (20) according to claim 1, wherein the outer conductor (26) is an elongated hollow profile element having a same cross section over its longitudinal extent.

3. The RFID reading apparatus (20) according to claim 2, wherein the elongated hollow profile is an extruded profile.

4. The RFID reading apparatus (20) according to claim 1, wherein the antenna (18) comprises a plurality of antenna modules connected in series.

5. The RFID reading apparatus (20) according to claim 1, wherein the slot structures (16) are of the same type.

6. The RFID reading apparatus (20) according to claim 1, wherein the slot structures (16) are distributed over the entire longitudinal extent.

7. The RFID reading apparatus (20) according to claim 1, wherein the slot structures (16) comprise at least one enlarged opening (44) at an end region.

8. The RFID reading apparatus (20) according to claim 1, wherein the slot structures (16) form a folded two-dimensional pattern.

9. The RFID reading apparatus (20) according to claim 1, wherein the slot structures (16) extend beyond a longitudinal edge (46) of the outer conductor (26).

10. The RFID reading apparatus (20) according to claim 1, wherein the outer conductor (26), in cross section, comprises a folded outer contour with at least one notch (48) and/or at least one projection (50).

11. The RFID reading apparatus (20) according to claim 1, wherein a tunable element (38) is assigned to each slot structure (16), and wherein the tunable element (38) is connected with the control and evaluation unit (24) via a signal line (42).

12. The RFID reading apparatus (20) according to claim 1, wherein the antenna (18) comprises at least one display element associated with the antenna modules.

13. The RFID reading apparatus (20) according to claim 1, wherein the antenna (18) is arranged parallel to shelf elements (10, 12) or is used as a shelf element (10, 12).

14. A method for manufacturing an antenna (18) comprising,
providing a plurality of slot structures (16) each for transmitting and receiving RFID signals on an elongated hollow profile element (26) over its longitudinal extent at a desired spacing,
cutting the elongated hollow profile element (26) to a desired length, and
arranging an inner conductor (28) in the elongated hollow profile element (26),
wherein the antenna is an antenna of an RFID reading apparatus (20) comprising
an elongated antenna (18) with an outer conductor (26) and an inner conductor (28) arranged in the outer conductor (26),
an RF transceiver (22) connected with the antenna (18),
and a control and evaluation unit (24) configured to communicate with an RFID transponder (14) via the RF transceiver (22) and the antenna (18) by means of RFID signals,
wherein the outer conductor (26) comprises a plurality of slot structures (16) over its longitudinal extent each for transmitting and receiving RFID signals and
a tunable element (38) is assigned to each slot structure (16), and wherein the tunable element (38) is connected with the control and evaluation unit (24) via a signal line (42).

15. The method according to claim 14, wherein the elongated hollow profile element (26) and thus the antenna (18) is completed at one end with a coaxial connector (30, 32) and at the other end with an end piece (34) comprising a matching element (36).

16. The method according to claim 15, wherein the matching element (36) absorbs RFID signals.

17. The method according to claim 16, wherein the matching element (36) comprises a resistor.

* * * * *